United States Patent
Huang

(10) Patent No.: US 10,260,471 B2
(45) Date of Patent: Apr. 16, 2019

(54) AIRCRAFT STARTING AND GENERATING SYSTEM

(71) Applicant: GE Aviation Systems LLC, Grand Rapids, MI (US)

(72) Inventor: Hao Huang, Dayton, OH (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 0 days.

(21) Appl. No.: 15/549,177

(22) PCT Filed: Feb. 18, 2015

(86) PCT No.: PCT/US2015/016366
§ 371 (c)(1),
(2) Date: Aug. 7, 2017

(87) PCT Pub. No.: WO2016/133503
PCT Pub. Date: Aug. 25, 2016

(65) Prior Publication Data
US 2018/0023529 A1  Jan. 25, 2018

(51) Int. Cl.
*F02N 11/04* (2006.01)
*B64D 31/02* (2006.01)
(Continued)

(52) U.S. Cl.
CPC ........... *F02N 11/04* (2013.01); *B64D 31/02* (2013.01); *F01D 15/10* (2013.01); *F02C 7/268* (2013.01);
(Continued)

(58) Field of Classification Search
CPC ......... F02N 11/04; B64D 31/02; F01D 15/10; F02C 7/268; H02K 19/38; H02P 2101/30;
(Continued)

(56) References Cited

U.S. PATENT DOCUMENTS 6,462,429 B1 * 10/2002 Dhyanchand ........... F02N 11/04
290/31
6,838,778 B1 * 1/2005 Kandil ..................... F02C 7/268
290/27
(Continued)

FOREIGN PATENT DOCUMENTS

CA  2843335 A1  8/2014
CN  103161640 A  6/2013
(Continued)

OTHER PUBLICATIONS

International Search Report and Written Opinion issued in connection with corresponding PCT application No. PCT/US2015/016366 dated Sep. 7, 2015.
(Continued)

*Primary Examiner* — Adolf D Berhane
(74) *Attorney, Agent, or Firm* — General Electric Company; Sean M. Weinman

(57) ABSTRACT

An aircraft starting and generating system includes a starter/generator that includes a main machine, an exciter, and a permanent magnet generator. The system also includes an inverter/converter/controller that is connected to the starter/generator and that generates AC power to drive the starter/generator in a start mode for starting a prime mover of the aircraft, and that converts AC power, obtained from the starter/generator after the prime mover have been started, to DC power in a generate mode of the. A load-leveling unit (LLU) is selectively coupled with a DC power output from the starter/generator and has an inverter/converter/controller (ICC) with an LLU metal oxide semiconductor field effect transistor (MOSFET)-based bridge configuration that supplies DC power to the DC power output in a supply mode, and that receives DC power from the DC power output, in a receive mode. A LLU bridge gate driver is configured to
(Continued)

drive the LLU MOSFET-based bridge during a supply mode and a receive mode using bi-polar pulse width modulation (PWM).

20 Claims, 9 Drawing Sheets

(51) Int. Cl.
| | |
|---|---|
| *F01D 15/10* | (2006.01) |
| *H02J 4/00* | (2006.01) |
| *F02N 11/08* | (2006.01) |
| *F02C 7/268* | (2006.01) |
| *H02K 19/38* | (2006.01) |
| *H02J 1/00* | (2006.01) |
| *H02J 7/34* | (2006.01) |
| *H02P 101/30* | (2015.01) |
| *H02M 3/158* | (2006.01) |
| *H02M 7/797* | (2006.01) |
| *H02P 6/32* | (2016.01) |

(52) U.S. Cl.
CPC .............. *F02N 11/087* (2013.01); *H02J 4/00* (2013.01); *H02K 19/38* (2013.01); *B60L 2200/10* (2013.01); *F02N 11/0862* (2013.01); *F02N 2011/0874* (2013.01); *F02N 2011/0896* (2013.01); *F05D 2220/768* (2013.01); *F05D 2260/85* (2013.01); *H02J 1/00* (2013.01); *H02J 7/34* (2013.01); *H02J 2001/004* (2013.01); *H02M 3/1584* (2013.01); *H02M 7/797* (2013.01); *H02P 6/32* (2016.02); *H02P 2101/30* (2015.01); *Y02T 10/642* (2013.01); *Y02T 50/671* (2013.01)

(58) Field of Classification Search
CPC ...... H02M 3/31584; H02M 3/00; H02M 5/00; H02M 7/00; H02M 3/33507; H02M 3/33523; H02M 3/3155; H02M 3/325
See application file for complete search history.

(56) References Cited

U.S. PATENT DOCUMENTS

| | | | |
|---|---|---|---|
| 6,838,779 B1* | 1/2005 | Kandil | F02C 7/268 290/31 |
| 7,821,145 B2* | 10/2010 | Huang | F02N 11/04 290/31 |
| 8,148,834 B2 | 4/2012 | Huang et al. | |
| 2005/0184698 A1* | 8/2005 | Anghel | H02P 6/185 318/715 |
| 2007/0222220 A1 | 9/2007 | Huang et al. | |
| 2009/0174188 A1* | 7/2009 | Huang | F02N 11/04 290/46 |
| 2017/0279031 A1* | 9/2017 | Yoo | H01L 41/45 |
| 2018/0026568 A1* | 1/2018 | Huang | F02N 11/04 290/31 |
| 2018/0034395 A1* | 2/2018 | Huang | H02P 9/302 |

FOREIGN PATENT DOCUMENTS

| | | |
|---|---|---|
| EP | 2562021 A2 | 2/2013 |
| WO | 2016/133502 A1 | 8/2016 |
| WO | 2016/133505 A1 | 8/2016 |
| WO | 2016/164032 A1 | 10/2016 |

OTHER PUBLICATIONS

Machine Translation and First Office Action and Search issued in connection with corresponding CN Application No. 201580076571.6 dated Jun. 26, 2018.

* cited by examiner

AIRCRAFT STARTING AND GENERATING SYSTEM

BACKGROUND OF THE INVENTION

The subject matter disclosed herein relates generally to a combination of a bidirectional energy conversion brushless electric rotating device that converts electrical energy to mechanical energy in start mode and mechanical energy to electrical energy in generate mode. In particular, the subject matter relates to an aircraft starting and generating system, that includes a three electric machine set, a Starter/Generator (S/G), and an IGBT based and digitally controlled device, referred to herein as an Inverter/Converter/Controller (ICC).

There currently exist starter generator systems for aircraft, which are used to both start an aircraft engine, and to utilize the aircraft engine after it has started in a generate mode, to thereby provide electrical energy to power systems on the aircraft. High voltage direct current (DC) power can be derived from an aircraft turbine engine driven generator and converter (EGC). Alternating current (AC) power can be derived from an AC generator driven by an aircraft turbine engine, or from conversion of DC power into AC power. It is known to use a wide band gap device to achieve efficiencies in a high voltage DC system of an aircraft turbine engine driven generator and converter (EGC) or in DC link voltage generation from an AC generator driven by an aircraft turbine engine. Likewise, it is known to use a wide band gap device to achieve efficiencies in an AC system of an aircraft turbine engine driven generator and converter (EGC) or in AC link voltage from a DC generator driven by an aircraft turbine engine. Low switching losses, low conduction losses, and high temperature capability are at least three advantages of a wide band gap device.

It is desirable to control a wide band gap device in a power generation system of an aircraft in order to consistently achieve the efficiencies.

BRIEF DESCRIPTION OF THE INVENTION

In one aspect, an aircraft starting and generating system, includes a starter/generator that includes a main machine, an exciter, and a permanent magnet generator, an inverter/converter/controller (ICC) having a MOSFET-based bridge configuration that is connected to the starter/generator and that generates AC power to drive the starter/generator in a start mode for starting a prime mover of the aircraft, and that converts AC power, obtained from the starter/generator after the prime mover have been started, to DC power in a generate mode of the starter/generator, and a main bridge gate driver configured to drive the MOSFET-based bridge. The main bridge gate driver operates to drive the MOSFET-based bridge during start mode using Space Vector Pulse Width Modulation (SVPWM) and during generate mode using reverse conduction based inactive rectification.

In another aspect, a method of controlling an aircraft starting and generating system having a starter/generator that includes a main machine, an exciter, and a permanent magnet generator, an inverter/converter/controller (ICC) having a MOSFET-based bridge configuration connected with the voltage output of the main machine winding, and main bridge gate driver configured to drive the MOSFET-based bridge. The method includes, if in start mode, supplying power to the MOSFET-based bridge and driving the main MOSFET-based bridge during start mode using Space Vector Pulse Width Modulation (SVPWM), and wherein the driving the main MOSFET-based bridge during start mode starts a prime mover of the aircraft, and if in generating mode, driving the MOSFET-based bridge using reverse conduction based inactive rectification to convert AC power, obtained from the main machine winding of the starter/generator, to DC power.

In another aspect, an aircraft includes an engine, and a starter/generator connected to the engine, and having a main machine, an exciter, and a permanent magnet generator. An inverter/converter/controller (ICC) having a MOSFET-based bridge configuration is connected to the starter/generator and generates AC power to drive the starter/generator in a start mode for starting the engine, and converts AC power, obtained from the starter/generator after the engine has been started, to DC power in a generate mode of the starter/generator. A main bridge gate driver is configured to drive the MOSFET-based bridge during start mode using Space Vector Pulse Width Modulation (SVPWM) and during generate mode using reverse conduction based inactive rectification.

DETAILED DESCRIPTION

Figure 1:
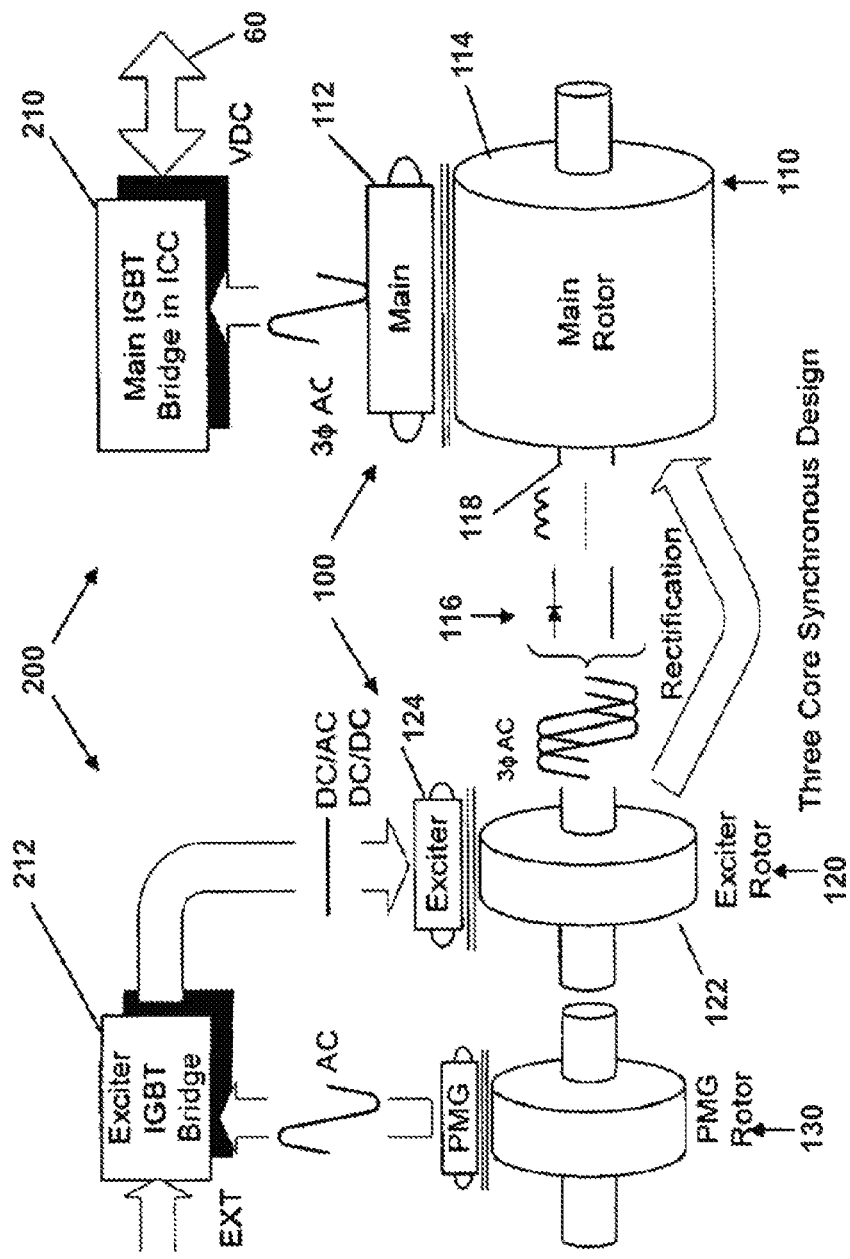
FIG. 1 illustrates a prior art environment of an overall S/G and ICC engine starting and power generating system for the present subject matter.
Figure 2:
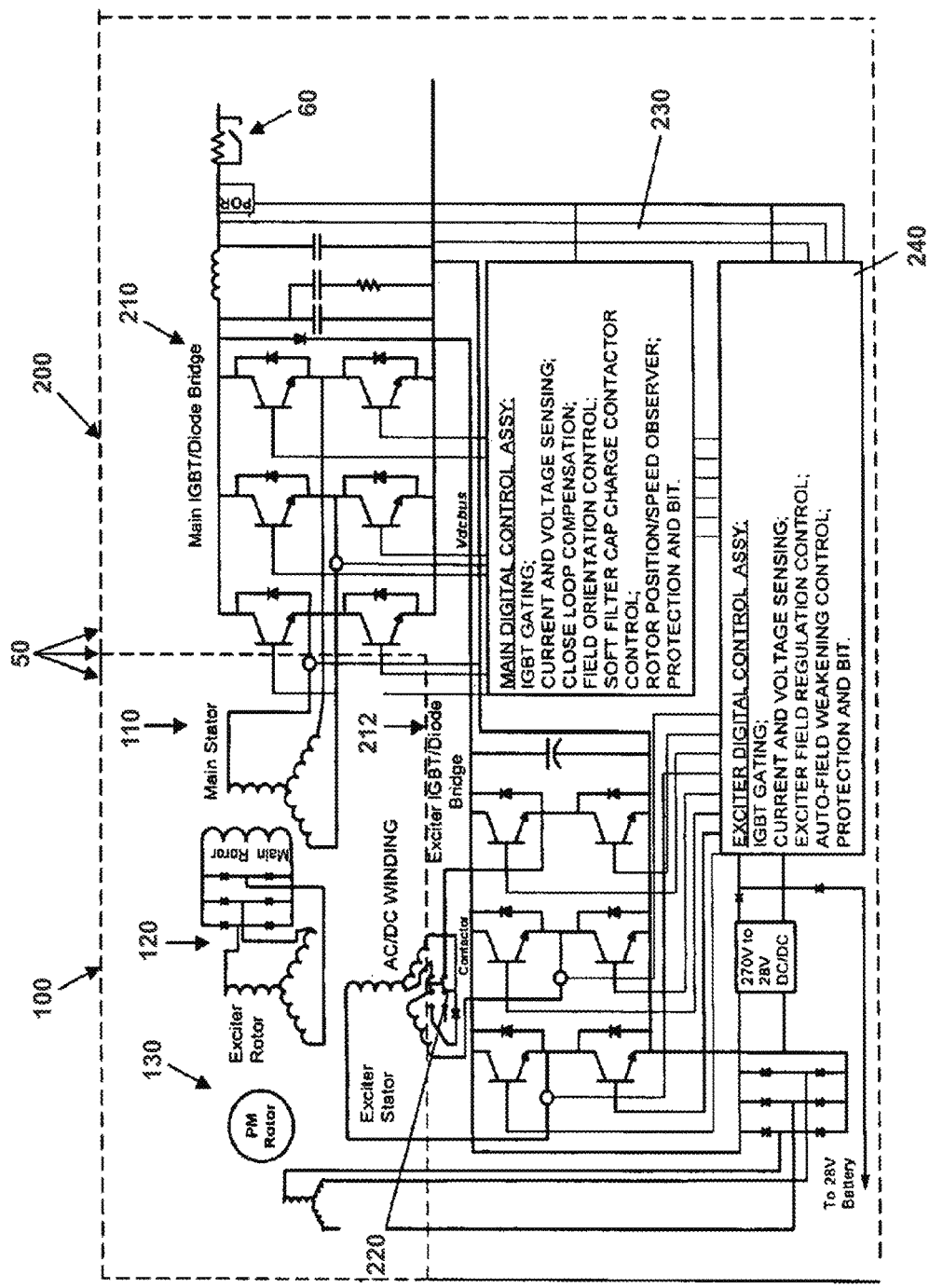
FIG. 2 is a block diagram of the overall S/G and ICC engine starting and power generating system of FIG. 1.
Figure 3:
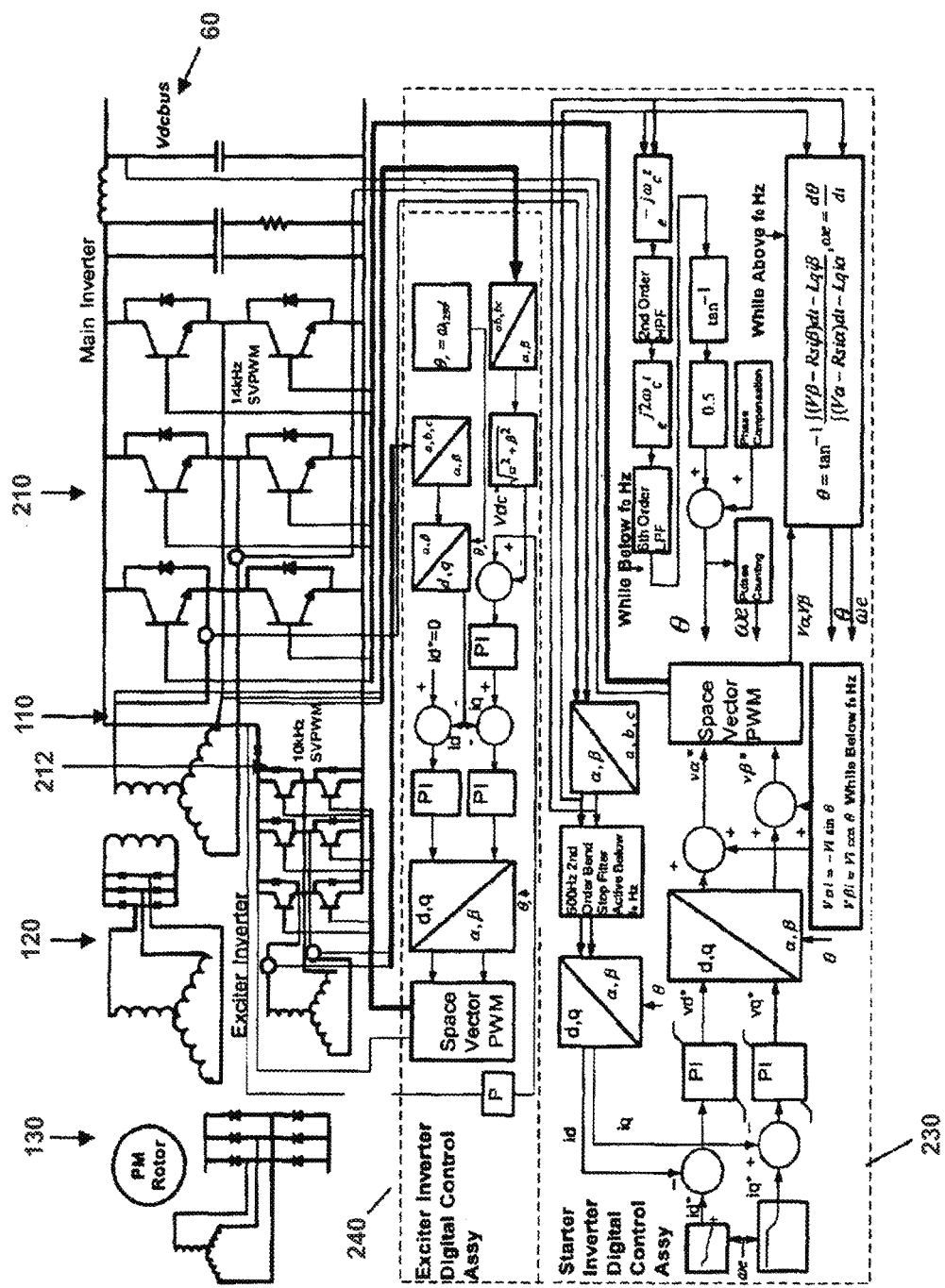
FIG. 3 is a block diagram of the S/G and ICC engine starting and power generating system of FIGS. 1 and 2 in start mode.
Figure 4:
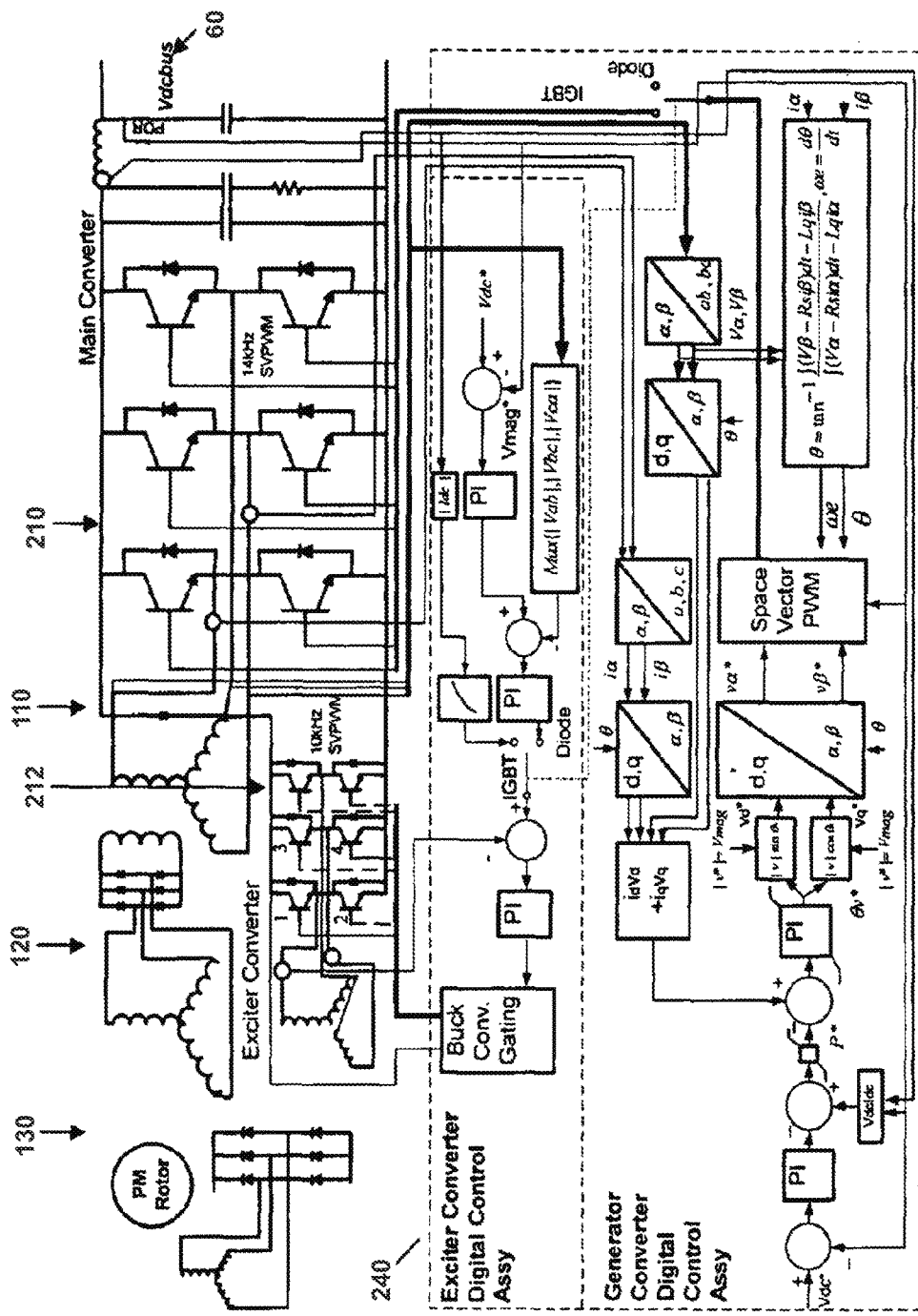
FIG. 4 is a block diagram of the S/G and ICC engine starting and power generating system of FIGS. 1 and 2 in generate mode.
Figure 5:
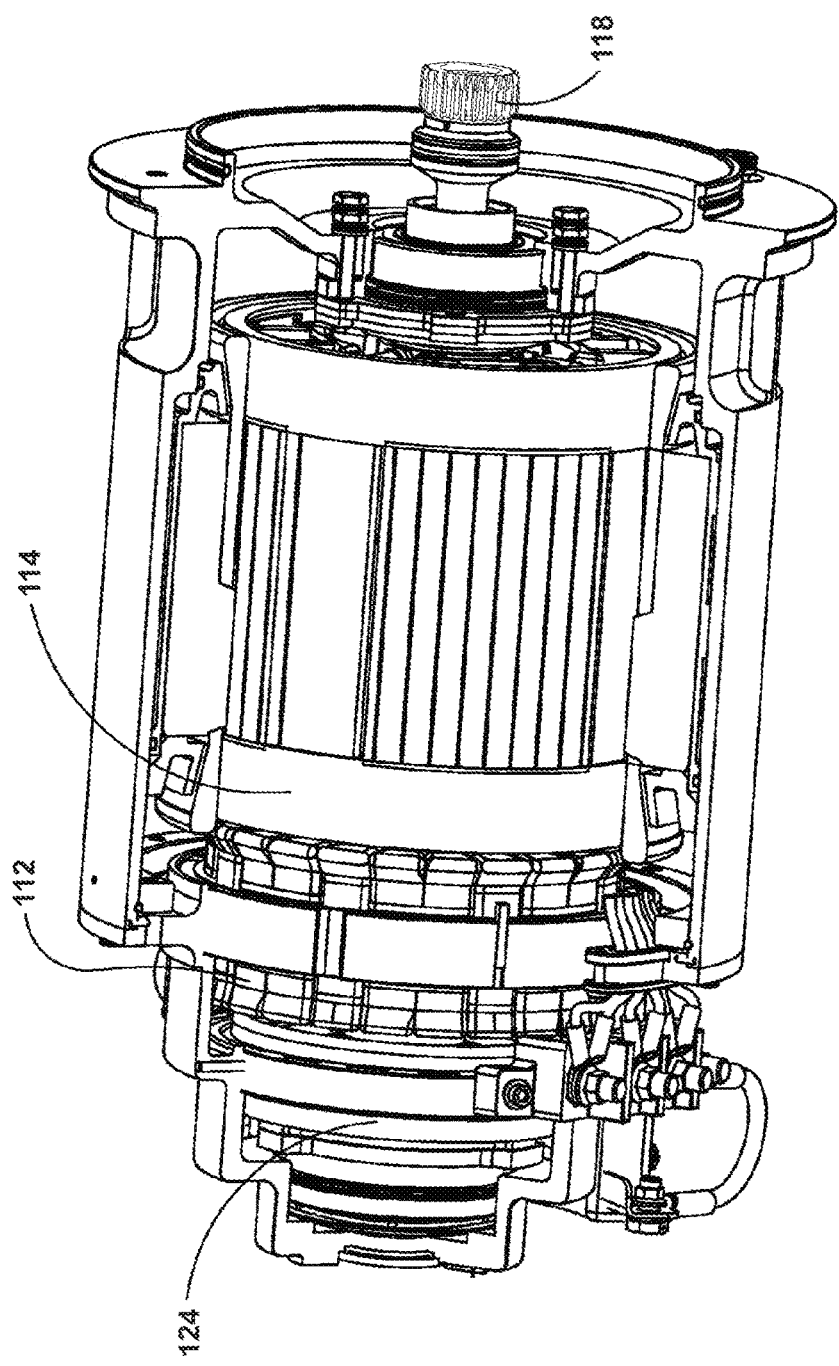
FIG. 5 is a section view of the S/G in FIG. 1.

The subject matter disclosed herein is usable in a system such as that shown in FIGS. 1-5. In one embodiment, an S/G and ICC engine starting and power generating system 50 includes an S/G 100 and an ICC 200. As illustrated in FIG. 1, FIG. 2 and FIG. 5, the S/G 100 is a combination of three electric machines, including a main machine 110, an exciter 120, and a PMG 130. This arrangement is called a three-machine set. The main machine 110 can be a salient synchronous machine. A stator 112 of the main machine 110 connects to a main IGBT/Diode Bridge 210 of the ICC 200. A rotor 114 of the main machine 110 connects to an output of a full wave or half wave-rotating rectifier 116 located inside a shaft 118 of the main rotor 114. An exciter rotor 122 has a three-phase winding that connects to an input of the rotating rectifier 116, and an exciter stator 124 includes a DC winding and a three-phase AC winding that connects to an exciter IGBT/Diode bridge 212 of the ICC 200 through a contactor 220 that is shown in FIG. 2. FIG. 2 provides a block diagram of the S/G and ICC system 50, with emphasis on the components making up the main IGBT/Diode bridge 210 and the exciter IGBT/Diode bridge 212.

The ICC 200 shown in FIG. 2 includes two IGBT/Diode bridges: the main bridge 210 and the exciter bridge 212. The main bridge 210 and the exciter bridge 212 are also referred to as a main inverter/converter and an exciter inverter/converter, respectively. Each is controlled by a digital control assembly. The assembly that controls the main IGBT/Diode Bridge 210 is called the main digital control assembly 230. Alternatively, it can also be called the starter inverter digital control assembly in start mode and the generator converter control assembly in generate mode. The assembly that controls the exciter IGBT/Diode Bridge 212 is called the exciter digital control assembly 240. Alternatively, it can also be called the exciter inverter digital control assembly in start mode and the exciter converter digital control assembly in generate mode. The main digital control assembly 230, along with its embedded software, controls the main bridge 210 that generates AC power to drive the S/G in start mode and converts the AC power to DC power requested on the aircraft in generate mode.

The S/G and ICC engine starting and power generating system 50 has two operating modes: start mode and generate mode. In start mode, the S/G and ICC system 50 is powered from a separate power source, VDC 60, whereby the connection to the separate power source VDC 60 is shown in FIG. 1 and FIG. 2. The main machine 110 works as a three-phase wound field salient synchronous motor in start mode. Two things have to happen in order to produce torque at the shaft of the synchronous motor. The first is to input three-phase alternating currents to the three-phase winding of the main stator 112, and the second is to provide excitation current to the main rotor 114. The frequency of the currents to the main stator 112 is provided so as to be proportional to the speed of the main machine. The three phase alternating currents are provided by the main IGBT/Diode Bridge 210. The rotating field generated by the three-phase current interacts with the magnetic field generated by the main rotor 114, thus creating the mechanical torque at the shaft of the main rotor 114.

Providing an excitation current to the main rotor 114 is a challenge in conventional generating systems because of the following. At the beginning of starting, any synchronous machine based exciter generates no power. At low speed, the synchronous machine based exciter cannot generate sufficient power to power the main rotor. This is because for any synchronous based exciter, its DC excitation winding does not transfer power to the rotor winding. In fact, for conventional generating systems, the power can only be transferred from mechanical energy on the shaft. Therefore, in order to start the engine, the power that generates the main rotor excitation current must come from the exciter stator 124. In other words, the energy for the excitation during start mode crosses the air gap of the exciter 120. Obviously, a rotating transformer is desired. Conversely, in generate mode, the main machine 110 works as a three-phase wound field salient synchronous generator. To produce electricity, one thing happens, i.e., excitation current is provided to the main rotor 114. A conventional synchronous exciter can be utilized for that purpose. The different modes require different power sources for excitation. One mode needs AC three-phase currents in the exciter stator 124, and the other needs DC current in the exciter stator 124.

A dual functional exciter stator works in conjunction with the contactor 220 located in the ICC. By switching the contactor to its appropriate position, the winding in the exciter stator is configured into an AC three phase winding during start mode. In this mode, the exciter stator 124 with the AC three phase winding and the exciter rotor 122 with another AC three phase form an induction exciter. Controlled by the exciter digital control assembly 240 in the ICC, the direction of the phase sequence of the AC three phase winding is opposite from the direction of the machine shaft. Thus, the induction exciter operates in its braking mode. In generate mode, the winding in the exciter stator 124 is configured into a DC winding. The exciter stator 124 with the DC winding and the exciter rotor 122 with the AC three-phase winding form a synchronous exciter. Without adding any size and/or weight to the exciter, the configured AC and DC windings generate the necessary rotating field in the air gap between the exciter rotor 122 and exciter stator 124 during start mode and generate mode respectively. Additionally, the AC winding transfers the power from the exciter stator 124 to the exciter rotor 122 during start mode.

In both start mode and generate mode, whenever IGBTs 215 of the main IGBT/Diode bridge 210 commutate, the mechanical position information of the main rotor 114 becomes needed for the power switch commutation. As shown in FIG. 2 and detailed in FIGS. 3 and 4, a sensorless rotor position signal $\theta$, $\omega_e$ (rotor position, rotor speed) is generated by the main digital control assembly 230. The rotor position signal is constructed through voltage and current signals of the S/G by the embedded software in the main digital control assembly 230

FIG. 3 presents a block diagram of the S/G and ICC system 50 in start mode. There are three electric machines—the main synchronous motor 110, the induction exciter 120, and the PMG 130. The main synchronous motor 110 and the induction exciter 120 play an important role in start mode. The main IGBT/Diode Bridge 210 receives DC input power from a DC bus (for example, 270 VDC), and inverts the DC power to AC power. The three-phase AC currents generated by the inverter feed into the main synchronous motor 110. The gating signals to generate the AC currents are controlled by the starter inverter digital control assembly 230. The starter inverter digital control assembly 230 measures Phase a current, Phase b current, and DC bus voltage. The Phase a and b currents are transferred to $\alpha$ and $\beta$ currents in the synchronous stationary frame by using a Clarke transformation realized through the embedded software in the main digital control assembly 230. The $\alpha$ axis coincides with the a axis that is located at the center of the Phase a winding of the main stator, while the $\beta$ axis is 90 electrical degrees ahead of $\alpha$ axis in space. The $\alpha$ and $\beta$ currents are further transferred to d and q currents in the synchronous rotational frame by using a Park transformation realized through the same embedded software. The d axis is aligned with the axis of the excitation winding of the main rotor 114, while the q axis is 90 electrical degrees ahead of the d axis in space.

As shown in FIG. 3, there are two current regulation loops—d and q loops. The outputs of the d and q loops are d and q voltages that are transferred back to $\alpha$ and $\beta$ voltages by using an Inverse-Park transformation before fed into the Space Vector Pulse Width Modulation (SVPWM). In order to perform Park and Inverse-Park transformations, the main rotor position angle is determined. The $\alpha$ and $\beta$ voltages are the inputs to the SVPWM which generates the gating signals for the IGBT switches. The switching frequency can be set at 14 kHz, or to some other appropriate frequency.

As shown in FIG. 3, similar to the starter inverter digital control assembly 230, the exciter inverter digital control assembly 240 also has Clarke, Park, and Inverse-Park transformations. Also, the exciter inverter digital control assembly 240 has d and q current regulation loops. The gating signals are generated by its corresponding SVPWM. Because, as mentioned previously, the fundamental frequency of the exciter IGBT/Diode bridge 212, or the exciter inverter, is fixed at 1250 Hz or at some other appropriate frequency, and the exciter 120 has no saliency on its rotor 122 and stator 124, the rotor position information can be artificially constructed by using formula 2πft, where f=1250 Hz and t is time. This is different from the main inverter, i.e., the real time rotor position information is not needed in this case. The SVPWM switching frequency of the exciter inverter is 10 Hz in one possible implementation, whereby other appropriately chosen switching frequencies can be utilized, while remaining within the spirit and scope of the embodiments of the invention.

In a second embodiment in start mode, the exciter 120 is configured as an induction machine operating in its braking mode, or alternatively described, the exciter 120 acts like a three-phase rotating transformer. The three-phase winding of the exciter stator 124 generates a rotating field that induces three-phase voltages in the exciter rotor 122. The direction of the rotating field is controlled opposite from the rotating direction of the main machine 110. Thus, the frequency of the voltage in the exciter rotor 122 increases along with the rotor speed during start mode. The DC power from an external power source is converted to three-phase 1250 Hz power (or to some other appropriate frequency) by the exciter IGBT/Diode Bridge 212. The power crosses the air gap and is transferred to the winding of the exciter rotor 122. The three-phase voltages are then rectified by the rotating rectifiers 116 inside of the rotor shaft of the main generator. The rectified voltage supplies the excitation power to the rotor 114 of the main machine 110. Once the rotor speed reaches the engine idle speed, start mode terminates and generate mode begins. The exciter rotor 122 receives energy from both the exciter stator 124 and the rotor shaft 118. At zero speed, all the energy comes from the exciter stator 124. The energy from the shaft 118 increases along with the increase of the rotor speed.

A sensorless implementation for constructing the main rotor position information by the digital control assembly 230 along with its embedded software includes two parts: a) high frequency injection sensorless estimation, and b) voltage mode sensorless estimation. The high frequency injection sensorless estimation covers from 0 rpm to a predefined low speed, such as 80 rpm. The voltage mode sensorless estimation covers from the speed, such as 80 rpm, to a high rotational speed, such as 14,400 rpm, where the engine is pulled to its cut-off speed. Most other sensorless methods, including the voltage mode sensorless mentioned above, fail at zero and low speed because these methods fundamentally depend on back-EMF. The high frequency injection method does not depend upon the back-EMF. Therefore, the method is feasible to use for the speed from 0 to a predefined low speed, such as 80 rpm. Accordingly, there is achieved rotor position estimation at rpm and at low speed of the main synchronous machine. The actual realization of the sensorless is described below.

As shown in FIG. 3, while the speed of the main machine 110 is below 80 rpm or the frequency of the main machine 110, $f_0 \leq 8$ Hz, a pair of 500 Hz sine waveform voltages $V_{\alpha i}$, $V_{\beta i}$ are superimposed on the inputs of the SVPWM. This 500 Hz frequency is called the carrier frequency. Other appropriate carrier frequencies can be utilized while remaining within the spirit and scope of the embodiments of the invention. In FIG. 3, this carrier frequency is represented by symbol $\omega_c$. The response of the current in each phase to these two superimposed voltages contains the rotor position information.

Each phase current of the main stator has several components. As shown in FIG. 3, the Phase a and b currents are transferred to α and β axes through Clarke transformation. The α and β currents contain the fundamental component with frequency of $\omega_r$, the positive sequence component with frequency of $\omega_c$, the negative sequence component with frequency of $2\omega_r-\omega_c$. The positive sequence component, $\omega_c$ is useless because it does not contain any rotor position information. Accordingly, this component is removed completely. As illustrated in FIG. 3, the α and β currents are rotated by $-\omega_c t$ degrees. Thus, the positive sequence component becomes a DC signal, which is then eliminated by using a 2nd order high pass filter, or some other type of high pass filter (e.g., 1st order, or 3rd order or higher). The remaining components, the fundamental frequency component and negative sequence component, contain the rotor information. However, the rotor position is determined before applying the fundamental current to the machine at zero speed and also, at zero and low speed the fundamental component is very weak. The only component that can reliably extract the rotor position information is the negative sequence component. After the previous rotation, the frequency of the component is changed to $2\omega_r-2\omega_r$. Another rotation, $2\omega_c t$, is then performed by the digital control assembly 230. The output of the rotation goes through a 6th order low pass filter, or to some other appropriate low pass filter (e.g., 1st, 2nd, . . . or 5th order low pass filter). Using $i_{\beta 2\theta}$ to represent the remaining signal of the β current and $i_{\alpha 2\theta}$ to represent the remaining signal of the α current, one obtains the following angle:

$$\theta' = 0.5\tan^{-1}\left(\frac{i_{\beta 2\theta}}{i_{\alpha 2\theta}}\right).$$

Unfortunately, the frequency of the above angle has two times frequency of the fundamental frequency, and thus it cannot be directly used to the Park and Inverse-Park transformations. To convert the above angle to the rotor position angle, it is detected whether θ' is under a north pole to south pole region or under a south pole to north pole region. If the θ' is under the north pole to south pole region, the angle is

θ=θ', and if the θ' is under the south pole to north pole region, the angle is

θ=θ'+π.

This angle is then utilized in the Park and Inverse-Park transformations in the d and q current regulation loops. As shown in FIG. 3, a band-stop filter (500 Hz filter as shown in FIG. 3, whereby other stop band frequencies can be utilized while remaining within the spirit and scope of the embodiments of the invention) is placed between Clarke and Park transformations to eliminate the disturbances of the carrier frequency on the d and q current regulation loops.

This high frequency injection sensorless method works satisfactorily at zero or low speed. However, the method will not work as well with the speed with which the frequency is close to or higher than the carrier frequency. Accordingly, another sensorless method is utilized when the speed goes above a certain threshold rotational speed, such as 80 rpm. This method is the voltage mode sensorless method, as described below.

The realization of the voltage mode sensorless is accomplished by the following. Although the method has been used in an induction motor and a PM motor, it has not been applied to a salient synchronous machine because the stator self-inductances are not constants, and instead, the inductances are functions of the rotor position. The conventional α and β flux linkage equations in the synchronous stationary frame, which are used to generate the rotor angle by arctangent of the β flux linkage over the α axis flux linkage, are not practical to be used for a salient wound field synchronous machine because the inductances change all the time. To overcome this problem, in the second embodiment, a pair of artificial flux linkages $\lambda_\alpha'$ and $\lambda_\beta'$ as well as their expressions, are derived:

$$\begin{cases} \lambda_\alpha' = \int e_\alpha' dt = \int (v_\alpha - R_s i_\alpha) dt - L_q i_\alpha \\ \lambda_\beta' = \int e_\beta' dt = \int (v_\beta - R_s i_\beta) dt - L_q i_\beta \end{cases}$$

where $R_s$ and $L_q$ are the main stator resistance and q axis synchronous inductance respectively. Both of the machine parameters are constant. Fortunately, $\lambda_\alpha'$ and $\lambda_\beta'$ align with the α and β flux linkages, respectively, and the angle $$\theta = \tan^{-1}(\lambda_\beta'/\lambda_\alpha')$$

is actually the rotor angle that can be used for Park and Inverse-Park transformations once the machine speed is above the threshold rotational speed, such as above 80 rpm. The equations can be implemented in the embedded software of the digital control assembly 230. This approach provides for reliable rotor position angle estimation while the machine speed is above a certain rotational speed, e.g., above 80 rpm.

A combination of two separate methods, the high frequency inject sensorless method and the voltage mode sensorless method, can provide the rotor position information with sufficient accuracy throughout the entire speed range of the synchronous machine based starter.

During starting, the voltage applied by the main inverter on the main machine 110 is proportional to the speed and matches the vector summation of the back-EMF and the voltage drops on the internal impedances of the main machine 110. The maximum applicable voltage by the inverter is the DC bus voltage. Once the vector summation is equal to the DC bus voltage, the inverter voltage is saturated. Once the saturation occurs, the speed of the main machine 110 cannot go any higher, and the d and q current regulation loops will be out of control. Often, the inverter will be over-current and shut off. The main digital control assembly 230 measures the line-to-line voltages, $V_{ab}$ and $V_{bc}$ that are sent to the exciter digital control assembly 240. A Clarke transformation is applied to these two line-to-line voltages. The vector summation of the two outputs of the transformation is used as the feedback of an auto-field weakening loop, as shown in FIG. 3. The DC bus voltage is factored and used as the reference for the control loop. The auto-field weakening control loop prevents the inverter voltage from the saturation, and, thus, prevents the main inverter current regulation loops from going out of control and shutting off.

The auto-field weakening can be combined with a near unity power factor control scheme to accomplish higher power density at high speed while the inverter voltage is saturated. By way of example and not by way of limitation, near unity corresponds to a power factor greater than or equal to 0.9 and less than 1.0. While the auto-field weakening maintenances the air gap field, there is applied a predetermined d-axis current profile that pushes the main machine 110 to operate in a near unity power factor region. As can be seen in the following equation, because the auto-field weakening, besides the term $\omega L_{md}(i_f+i_d)$ remains consistently significant, and term $\omega L_{mq} i_d i_q$ becomes significant too. This significantly increases the power density of the S/G:

$$P = \omega L_{md}(i_f+i_d) i_q - \omega L_{mq} i_d i_q,$$

where P and ω are electromechanical power and rotor speed respectively, and $L_{md}$ and $L_{mq}$ are d and q magnetizing inductances, respectively.

The torque density at the speed below the base speed can be increased. As mentioned previously, there are two current regulation loops in the main inverter digital control assembly 230. One is the d axis loop and the other is the q axis loop. In general, the q loop controls the torque generation and the d loop controls the field in the air gap. This approach is also called a vector control approach. In order to achieve high torque density, the machine-to-magnetic saturation region is driven into by applying sufficient rotor excitation current $i_f$ and the torque generation current $i_q$. However, after the currents reach certain levels, no matter how the magnitudes of the currents $i_q$, $i_d$, and $i_f$ are increased, the torque remains the same because the machine is magnetically saturated. The remedy is to utilize the vector control set up to maximize the reluctance torque of the machine. The electromechanical torque generated by the machine is:

$$T = L_{md}(i_f+i_d) i_q - L_{mq} i_d i_q,$$

where $L_{md}$ and $L_{mq}$ are d and q magnetizing inductances respectively. Once the machine is magnetically saturated, the term, $L_{md}(i_f+i_d)$ becomes a constant. Therefore, the way to generate a reluctance torque is to apply negative id to the machine. Knowing $i_d = I \sin \delta$ and $I_q = I \cos \delta$, performing an optimization to the above equation, one arrives an optimum profile of the $i_d$ current:

$$i_d = \frac{\left(\left(\frac{\lambda_i}{L_{mq}}\right) - \sqrt{\left(\left(\frac{\lambda_i}{L_{mq}}\right)^2 + 4 i_q^2\right)}\right)}{2},$$

where $\lambda_i$ is the internal flux linkage of the machine.

An approximate 38% torque increase can achieve by applying the $i_d$ profile at the input of the vector control, based on simulations performed by the inventors. In summary, with the vector control set and appropriate $i_d$ current profile obtained, the torque density of the machine increases dramatically.

In a third embodiment configuration and control of the ICC to achieve maximum efficiency of power generation is applicable to the generate mode of the S/G and ICC system 50.

In generate mode, as shown in FIG. 2, the main machine 110 becomes a synchronous generator and exciter 120 becomes a synchronous generator. The PMG 130 provides power to the exciter converter through a rectifier bridge as shown. The exciter converter includes two active IGBT/Diode switches in exciter IGBT/Diode bridge 212, as illustrated in FIG. 4. The IGBT/Diode switches with solid lines at their gates are the ones used for the exciter converter. These are IGBT switch number 1 and IGBT switch number 4. During generate mode, IGBT 1 is in PWM mode and IGBT 4 is on all the time. The rest of the other IGBTs are off. Number 2 diode is used for free wheeling. IGBT 1, IGBT 4 and Diode 2 plus the exciter stator winding, form a buck converter that steps down the DC bus voltage, for example, 270 VDC, to the voltage generating the desired excitation current of the synchronous exciter.

Inactive and active rectification is configurable. Controlled by the exciter converter digital control assembly 240 and the main converter digital control assembly 230, the main IGBT/Diode Bridge can become an inactive rectifier or an active rectifier, depending upon the application. For an application where the power flow has only a single direction, the IGBT/Diode Bridge is configured into a diode operational bridge by the main converter digital control assembly 230. For an application where the power flow has bi-directions, the IGBT/Diode Bridge is configured into an IGBT and diode operational bridge by the same digital control assembly. When the power flow direction is from the ICC to the load, the S/G and ICC system is in generate mode. When the power flow direction is from the load to the ICC, the system is in so called regeneration mode, which is actually a motoring mode. In the inactive rectification, only the intrinsic diodes in the IGBT switches of the main inverter, also called main IGBT/Diode Bridge, are utilized. The voltage regulation is accomplished by the embedded software in the exciter digital control assembly 240, and the generator converter digital control assembly 230 keeps the IGBTs in the main inverter off, as illustrated in FIG. 4. There are three control loops controlling the voltage of POR. The most inner one is the current regulator. The measured excitation current is the feedback, and the output of the AC voltage regulator is the reference. The current regulator controls the excitation current at the commanded level. The next loop is the AC voltage loop. As shown in FIG. 4, the feedback signal is max$\{|V_{ab}|, |V_{bc}|, |V_{ca}|\}$. The reference is the output of the DC voltage regulator. The AC voltage loop plays an important role in keeping the DC voltage of the point-of-regulation (POR) in a desired range during load-off transients. The last control loop is the DC voltage loop. The measured voltage at the POR is compared with the reference voltage, 270 VDC. The error goes into the compensation regulator in the corresponding digital controller. Thus, the DC voltage of the POR is regulated.

As mentioned previously, for the power generation application where regeneration is required, the main IGBT/Diode Bridge will be configured into an active rectifier. In such a configuration, the voltage regulation is realized through the following. As illustrated in FIG. 4, both the embedded codes in the exciter digital control assembly and in the main digital control assembly are structured differently from those of the inactive rectification. Regarding the control on the exciter side, the excitation current loop becomes a PI control loop only. The reference of the control loop is generated through a look up table that is a function of the DC load current. The table is generated in such a way the current in the main stator approach to its minimum possible value. The control on the main side outer control loop is the DC voltage loop. The reference is 270 VDC; the feedback signal is the POR voltage. As shown in FIG. 4, the control loop is a PI controller with a feedforward of the DC output power added to the output of the PI controller. The DC output power is equal to the product of the DC output current and the POR voltage. The sum of the feedforward signal and the output of the PI controller is a power command that is utilized as the reference for the inner control loop, which is also a PI controller. The feedback signal is the power computed by using the voltages and currents of the generator as shown in FIG. 4. The output of the inner control loop is the voltage angle θv and is utilized to generate the SVPWM vectors $V_d^*$ and $V_q^*$. The two vectors are the input of the Park inverse transformation. The output of the transformation is the input of the SVPWM as shown in FIG. 4.

Control of the IGBT converter can combine auto-field modification and over-modulation to achieve optimum efficiency of the IGBT generate mode operation.

As presented in FIG. 4, $V_d^*$ and $V_q^*$ are calculated through the following equations:

$$V_d^* = |V^*| \sin \theta_v$$

$$V_q^* = |V^*| \cos \theta_v$$

where $|V^*| = V\text{mag}$.

To optimize the efficiency, first, Vmag is chosen to be 1 pu, thus forcing the converter into the full over-modulation region and completely dropping the IGBT switching caused by SVPWM. This minimizes the IGBT switching losses. The IGBT acts like phase shifting switching.

Because Vmag is constant, the power loop regulates the power by adjusting the angle θv. When the load is zero, θv approaches to zero, and when the load increases, θv increases.

The second factor of achieving the optimized efficiency is to optimize the exciter field current so $i_d$ current is minimized. Thus, the conduction losses of the IGBTs and copper losses of the generator are minimized. It is found that the exciter field current is directly related to the DC load current. The higher DC load current is, the higher exciter field current is required. For the purpose of achieving of minimum exciter field current, a look up table is generated through measurement. The input of the look up table is the DC load current, and the output of look up table is the command of the exciter field current of the exciter stator. The table is generated in such a way that for each a DC load current point, an optimal exciter field current is found when $i_d$ current is at its minimum. Such a control method not only achieves the optimal efficiency of the S/G and ICC system, but also provides an effective approach such that the operational point can easily swing from generate mode to regenerate mode, i.e., motoring mode. Thus, sending back the excessive energy on the DC bus to the generator in a fastest manner is accomplished. The third aspect of the third embodiment is directed to providing an IGBT commutation approach during generate mode. The IGBTs' commutation is based on a sensorless voltage mode, which is a similar sensorless approach used in start mode. However, because the operating mode changes between diode only mode and IGBT mode, the rotor position angle is determined before going into the IGBT mode. $V_\alpha$ and $V_\beta$ are obtained directly from the line-to-line voltage measurement instead of from the SVPWM commands.

Regeneration can be accomplished by absorbing excessive energy on the DC bus into the machine while regulating the bus voltage simultaneously. During generate mode, there can be excessive energy created by the load. Such excessive energy raises the DC bus voltage. This energy can be absorbed by the machine through the regeneration approach provided by the over-modulation SVPWM of this embodiment of the invention. During this situation, the main inverter digital control reverses the direction of the voltage angle θv, and forces the main IGBT/Diode Bridge into motoring mode. Thus, the direction of the power flow will be reversed. The power will flow from the load into the machine. The over-modulation keeps the IGBTs from switching, thus, minimizes the switching losses. This aspect of the embodiments of the present invention provides a fast way to swing the main IGBT/Diode Bridge from generate mode to regenerate mode, and vice versa.

Figure 6:
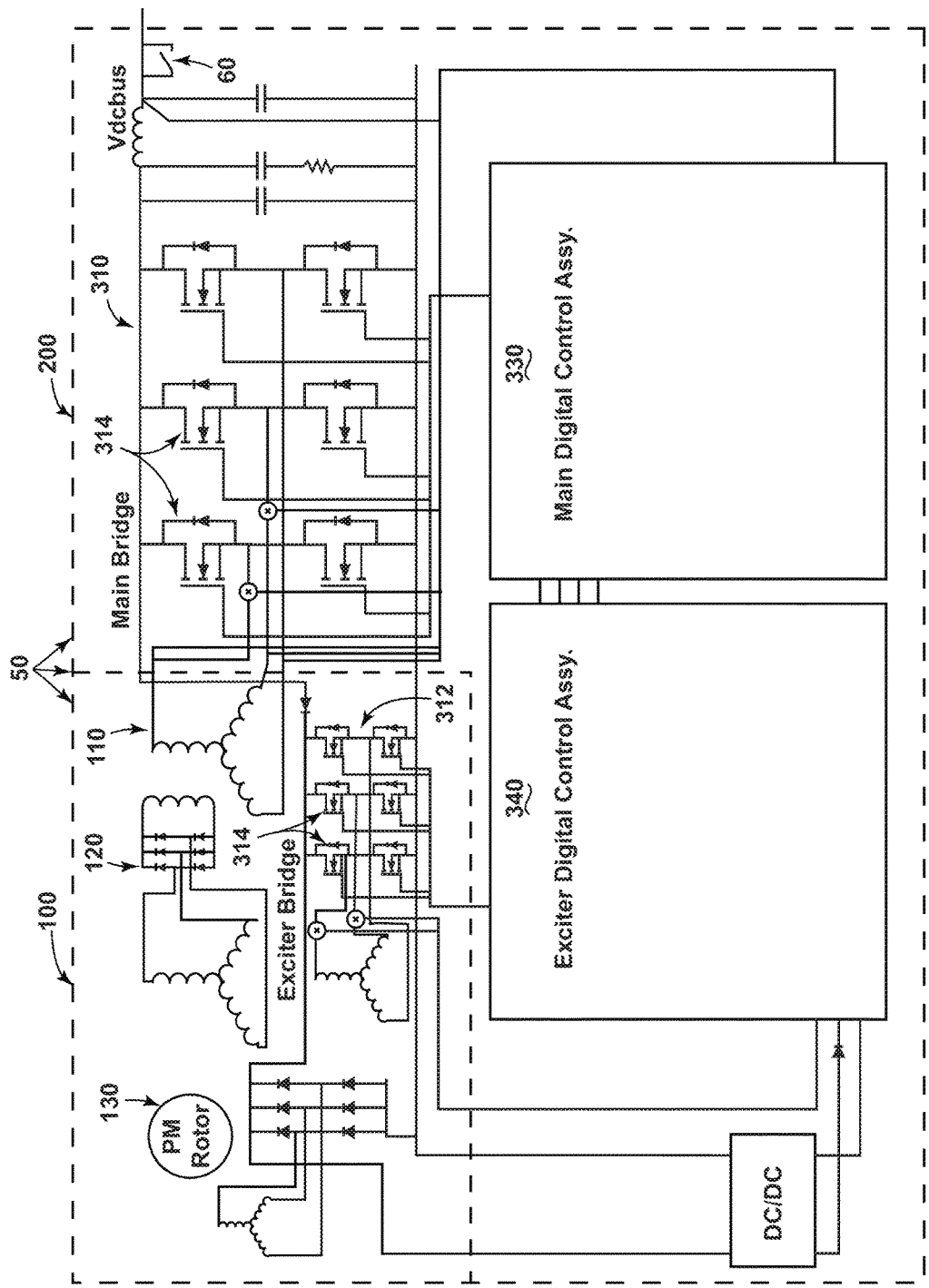
FIG. 6 is block diagram of the S/G and ICC engine starting and power generating system having a main machine MOSFET-based bridge.

Other embodiments and configurations in the foregoing environment are contemplated in the subject matter of the present disclosure. For example, a fourth embodiment is illustrated in FIG. 6. The fourth embodiment has elements similar to the first, second, and third embodiments; therefore, like parts will be identified with like numerals, with it being understood that the description of the like parts of the first, second, and third embodiments apply to the fourth embodiment, unless otherwise noted.

One difference between the prior embodiments and the fourth embodiment is that the fourth embodiment has removed the contactor 220. While the contactor 220 is not included in the fourth embodiment, alternative embodiments of the invention can include a contactor 220, as described herein.

Another difference between the prior embodiments and the fourth embodiment is that the fourth embodiment, as shown, replaces the IGBT/Diode bridge of each of the exciter 120 and main machine 110 with a metal-oxide-semiconductor field-effect transistor (MOSFET)-based bridge configuration, shown as a main machine MOSFET bridge 310 and an exciter MOSFET bridge 312. Each respective MOSFET bridge 310 includes an array of individually-controllable MOSFET devices 314, and in addition to a MOSFET body diode, each device 314 can be optionally configured to include an external diode configured across the MOSFET body diode. Alternatively, embodiments of the invention can enable the elimination of an external diode that is used for wide band gap MOSFET devices 314 due to the devices 314 having undesirable body diode electrical characteristics, such as higher power losses. The main machine MOSFET bridge 310 is communicatively coupled with, and controllable by a main machine digital control assembly 330. Likewise, the exciter MOSFET bridge 312 is communicatively coupled with, and controllable by an exciter digital control assembly 340.

Each MOSFET 314 and/or each MOSFET bridge 310, 312 can include one or more solid state switches and/or wide-band gap devices, such as a silicon carbide (SiC) and/or gallium nitride (GaN)-based high bandwidth power switch MOSFET. SiC or GaN can be selected based on their solid state material construction, their ability to handle large power levels in smaller and lighter form factors, and their high speed switching ability to perform electrical operations very quickly. Other wide-band gap devices and/or solid state material devices can be included.

Each of the digital control assemblies 330, 340 are shown coupled with each MOSFET 314 gate of the respective MOSFET bridges 310, 312, and operates to control and/or drive each respective bridge 310, 312 according to the various modes described herein. For example, the main machine digital control assembly 330, along with its embedded software, can control the main machine MOSFET bridge 310 that (1) generates AC power to drive the S/G 100 in start mode for starting a prime mover of the aircraft, and (2) converts AC power, obtained from the starter/generator 100 after the prime mover have been started, to DC power in a generate mode of the starter/generator 100, as described above. During operation of the $4^{th}$ embodiment, the main machine digital control assembly 330 can controllably operate the main machine bridge 310 to switch the control method from start mode to generate mode after the starting of the prime mover of the aircraft.

In one example, the main machine MOSFET bridge 310 and main machine digital control assembly 330 can be configured to drive the bridge 310 during start mode using SVPWM, as described herein. As used herein, "driving" a MOSFET bridge can include operating gate control and/or switching patterns according to a control methodology example, e.g., SVPWM. Additional switching patterns are possible.

In another example, the main machine MOSFET bridge 310 and main machine digital control assembly 330 can be configured to drive the bridge 310 during generate mode using a reverse conduction based inactive rectification methodology. One example of reverse conduction based inactive rectification has been illustrated in a simplified electrical circuit shown in FIG. 7. In the first circuit 400, a single phase of current is shown traversing a first MOSFET 402 having an active gate (e.g. the current is traversing the MOSFET channel as opposed to the body diode) by conducting current in reverse, that is, conducting current in the MOSFET channel in the direction from the source terminal to the drain terminal. The current further traverses through an electrical load 404, and returns through a second MOSFET 406 having an active gate, also conducting in reverse. The first circuit 400 further illustrates a third MOSFET 408 having an inactive gate (e.g. not conducting via the MOSFET channel).

The second circuit 410 illustrates a first controllable switching event wherein each of the second MOSFET 406 and third MOSFET 408 are shown having inactive gates, and the return current conducts through each respective MOSFET 406, 408 body diode. During the first controllable switching event of the second circuit 410, the current is shown commutating from the second MOSFET 406 to the third MOSFET 408. The third circuit 420 illustrates a second controllable switching event wherein the third MOSFET 408 is shown having an active gate and conducting current in reverse via the MOSFET channel. In the third circuit 420, neither the second nor third MOSFET 406, 408 is conducting current via a respective body diode.

Figure 7:
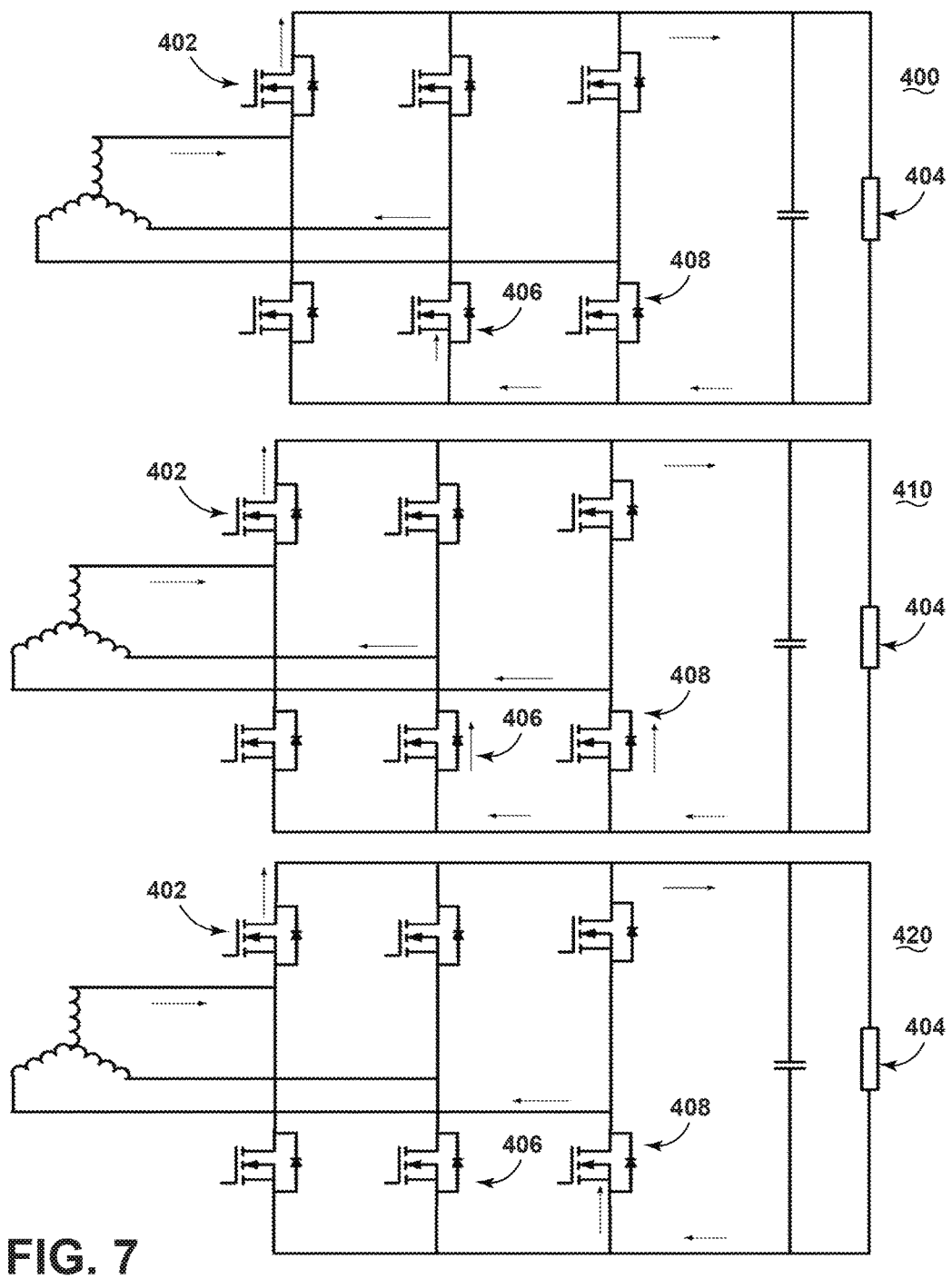
FIG. 7 is an example circuit diagram of a reverse conduction based inactive rectification MOSFET-switching methodology.

While FIG. 7 illustrates only a single phase, controllable switching event, the method of reverse conduction based inactive rectification can be utilized to control the MOSFET bridge (via MOSFET gate control and timing) to provide three phase AC power rectification to DC power, and described herein.

In yet another example, the main machine digital control assembly 330, along with its embedded software, can control the main machine MOSFET bridge 310 such that the bridge 310 generates AC power to drive the S/G 100 in motoring mode for motoring and/or moving a prime mover of the aircraft, in order to perform testing and/or diagnostics on the S/G 100 and/or prime mover. In this example, the main machine MOSFET bridge 310 and main machine digital control assembly 330 can be configured to operate and/or drive the bridge 310 during motoring mode using SVPWM, as described herein.

Thus, the main machine MOSFET bridge 310 can controllably act to invert and/or convert power, as controlled by the main machine digital control assembly 330. While only the operation of the main machine MOSFET bridge 310 has been described, other embodiments can include similar operations of the exciter MOSFET bridge 312, wherein the exciter MOSFET bridge 312 is controllably operated by the exciter digital control assembly 340 to drive the exciter MOSFET bridge 312 using SVPWM during generate mode. As with the previous embodiments, while bi-directional power flow is described (i.e. a starter/generator 100), embodiments can include single-directional power flow, such as a generator. Furthermore, additional components can be included, for example, a main machine MOSFET bridge 310 digital signal processor (DSP) to provide input relating to the timing and/or method operation of the main machine digital control assembly 330, such as by sensing or predicting the starter/generator 100 rotor position.

The embodiment can be further configured such that the main machine MOSFET bridge 310 absorbs the excess electrical energy of the aircraft electrical power system by, for instance, operating the main machine digital control assembly 330 to control the main machine MOSFET bridge 310 such that excess energy is stored in the kinetic energy of the rotor and/or prime mover of the aircraft, and wherein the main machine bridge gate driver operates to drive the main machine MOSFET-based bridge during regeneration mode using Space Vector Pulse Width Modulation.

Figure 8:
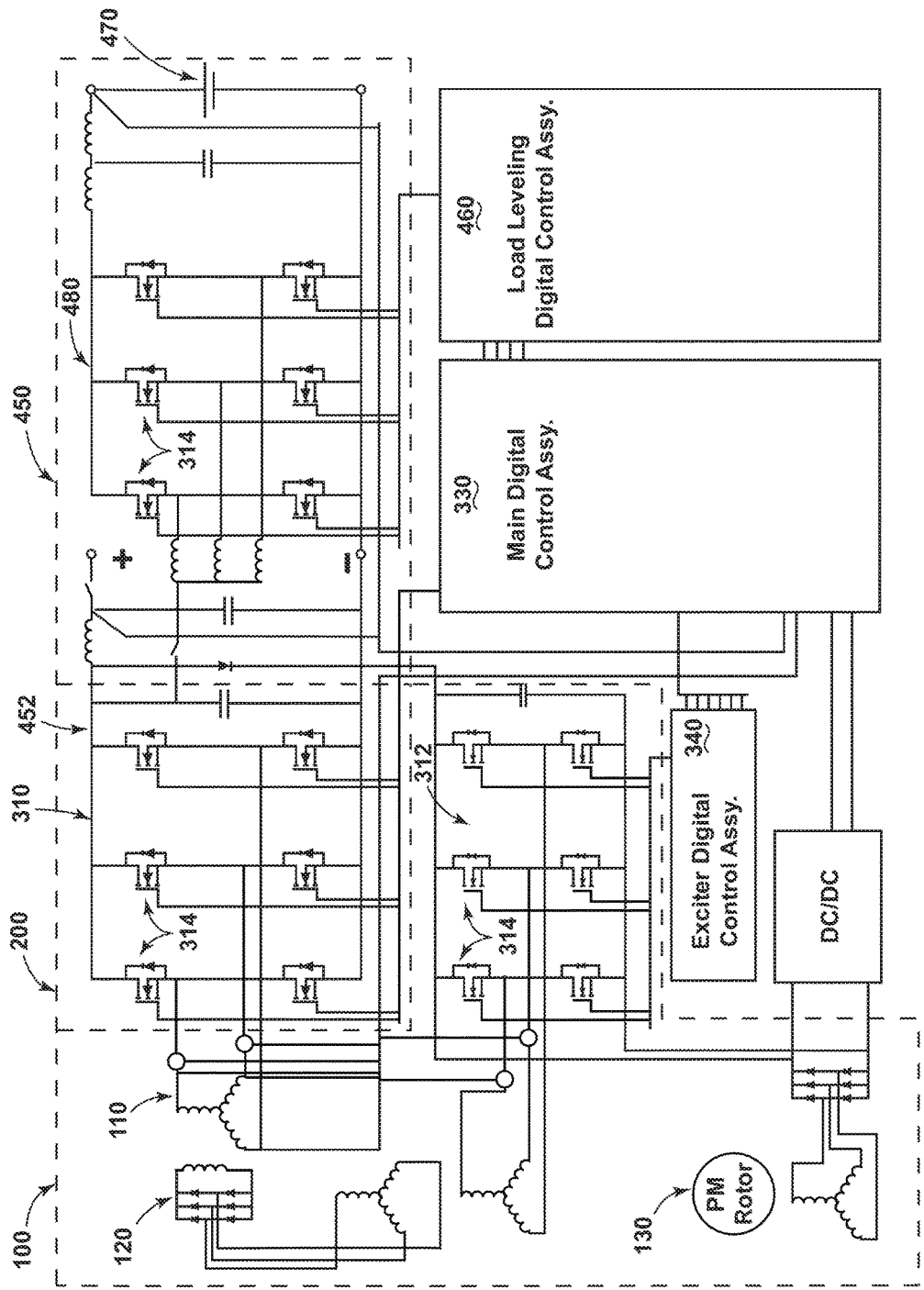
FIG. 8 is a block diagram of the S/G and ICC engine starting and power generating system, with a load leveling unit having a MOSFET-based bridge.

In a fifth embodiment, as shown in FIG. 8, the starter/generator 100 can further include a load leveling unit (LLU) 450 selectively coupled with the DC power output 452 of the main machine 110 and/or ICC 200. The LLU 450 can include an integrated redundant regeneration power conversion system, for example, having a power storage device 470 such as a battery, a fuel cell, or an ultracapacitor. The LLU 450 can be configured to operate such that electric energy of the aircraft electrical power system is selectively absorbed and/or received by the power storage device 470 (i.e. "receive mode") during periods of excess power, for example, when excess energy is returned from aircraft electric flight control actuation or excess power generation from the starter/generator 100. The LLU 450 can be further configured to operate such that electric energy of the power storage device 470 is supplied (i.e. "supply mode") during periods of peak power, or insufficient power generation, such as during engine starting and/or high power system demands such as flight control actuation.

As shown, the LLU 450 can include an inverter/converter/controller, such as an LLU MOSFET-based bridge 480, similar to the main machine MOSFET bridge 310 described herein, and whose output is selectively paralleled with the DC output of the starter/generator 100. An LLU digital control assembly 460 can be included and configured to selectively drive the LLU MOSFET bridge 480 during various operation modes. For example, when the LLU 450 is operating to supply DC power to the DC power output of the starter/generator 100 during supply mode, the LLU digital control assembly 460 can be operating the LLU MOSFET bridge 480 gates by utilizing a bi-polar pulse width modulation (PWM) method. The LLU 450 can operate in supply mode to provide power to the main machine MOSFET bridge 310 to operate in start and/or motoring mode, as described herein. In another example, when the LLU 450 is operating to receive DC power from the DC power output of the starter/generator during receive mode, the LLU digital control assembly 460 can be operating the LLU MOSFET bridge 480 gates by utilizing a bi-polar PWM method.

The LLU 450 can operate in receive mode to absorb power from the main machine MOSFET bridge 310 while operating in generate mode, as described herein. In this sense, the LLU 450 can operate to discharge power to the aircraft electrical system, as well as recharge from excess power on the aircraft electrical system. The embodiment can be further configured such that the main machine MOSFET bridge 310 absorbs the excess electrical energy of the aircraft electrical power system in the event of LLU 450 failure by, for instance, operating the main machine digital control assembly 330 to control the main machine MOSFET bridge 310 such that excess energy is stored in the kinetic energy of the rotor and/or prime mover of the aircraft, and wherein the main machine bridge gate driver operates to drive the main machine MOSFET-based bridge during regeneration mode using Space Vector Pulse Width Modulation. As with the embodiments of the invention described above, each respective MOSFET bridge 310, 312, 480 includes an array of individually-controllable MOSFET devices 314, and in addition to a MOSFET body diode, each device 314 can be optionally configured to include an external diode configured across the MOSFET body diode.

Figure 9:
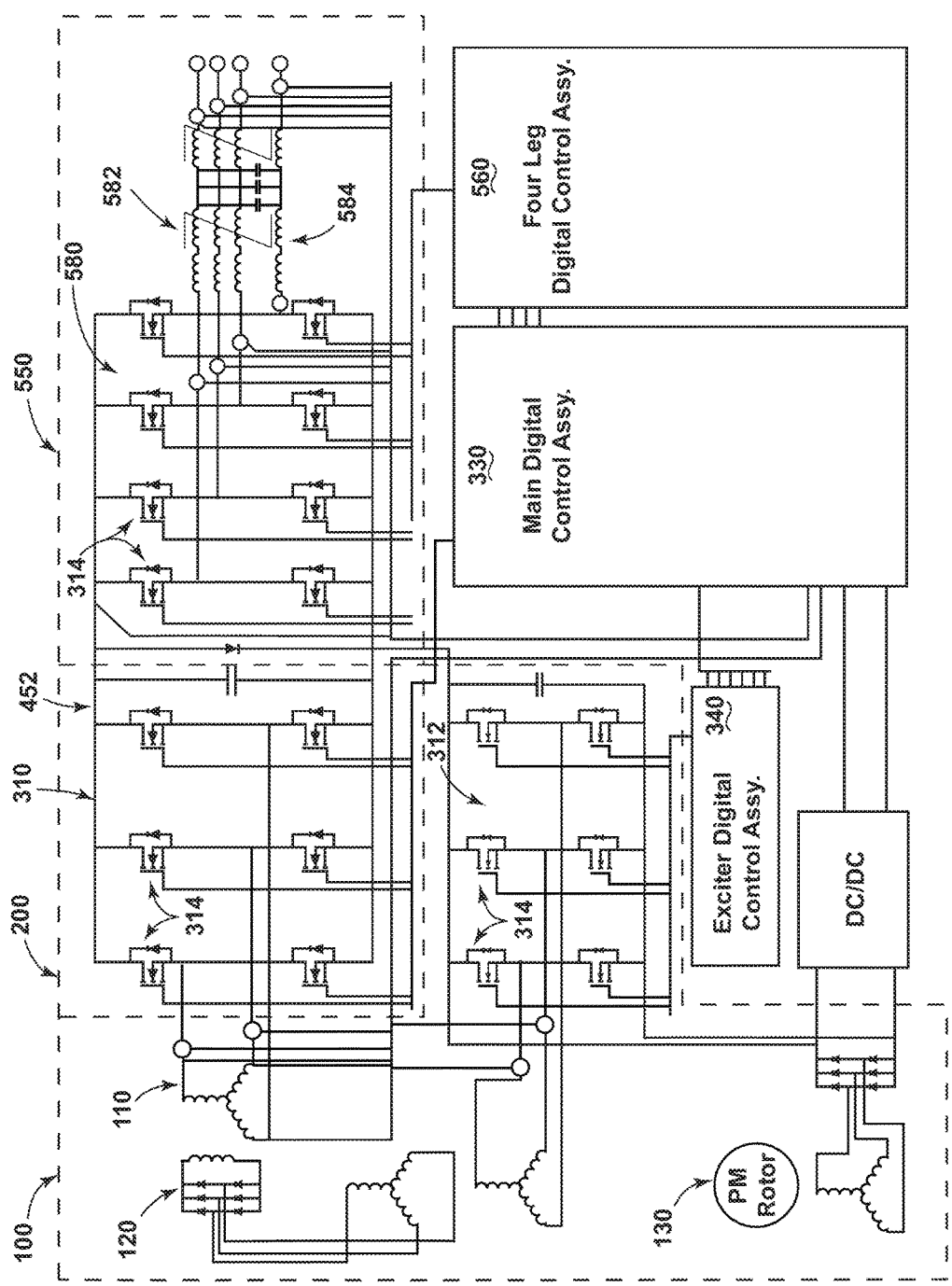
FIG. 9 is a block diagram of the S/G and ICC engine starting and power generating system, with a four-leg MOSFET-based bridge.

In yet another example embodiment, as shown in FIG. 9, the starter/generator 100 can further include a four leg inverter 550 coupled with the DC power output 452 of the main machine 110 and/or ICC 200. The four leg inverter 550 can operate to convert DC power received from the DC power output 452 of the main machine 110 and/or ICC 200 to AC power in a generate mode, and can further operate to generate and provide DC power to drive the starter/generator in a start mode for starting a prime mover of the aircraft.

As shown, the four leg inverter/converter 550 can include an inverter/converter/controller, such as a four leg MOSFET-based bridge 580, similar to the main machine MOSFET bridge 310 described herein, and configured having three outputs 582 for three distinct phases of AC power, and a fourth output 584 for a neutral output, relative to the three phases of AC power. In one example, the three phase AC output can be at 400 Hz. The embodiments can further include a four leg digital control assembly 560 configured to selectively drive the four leg MOSFET bridge 580 during various operation modes. For example, when the four leg inverter/converter 550 is operating to convert DC power from the DC power output 452 to three phase (and neutral) AC power during generate mode, the four leg digital control assembly 560 can be operating the four leg MOSFET bridge 580 gates by utilizing a bi-polar PWM method. The four leg inverter/converter 550 can further operate in start mode to provide power to the main machine MOSFET bridge 310 to operate in start and/or motoring mode, as described herein, by operating the four leg MOSFET bridge 580 gates utilizing a bi-polar PWM method.

The embodiment can be further configured such that the main machine MOSFET bridge 310 absorbs the excess electrical energy of the aircraft electrical power system by, for instance, operating the main machine digital control assembly 330 to control the main machine MOSFET bridge 310 such that excess energy is stored in the kinetic energy of the rotor and/or prime mover of the aircraft, and wherein the main machine bridge gate driver operates to drive the main machine MOSFET-based bridge during regeneration mode using Space Vector Pulse Width Modulation. As with the embodiments of the invention described above, each respective MOSFET bridge 310, 312, 580 includes an array of individually-controllable MOSFET devices 314, and in addition to a MOSFET body diode, each device 314 can be optionally configured to include an external diode configured across the MOSFET body diode.

Additional embodiments of the invention contemplate alternative iterations of the MOSFET-based bridges described herein. For example, one embodiment of the invention can have an exciter MOSFET bridge 312 and a LLU MOSFET bridge 480. Another embodiment of the invention can have a main machine MOSFET bridge 310 and a four leg MOSFET bridge 580. Yet another embodiment of the invention can have only a main machine MOSFET bridge 310. Furthermore, any of the MOSFET bridges described herein can operate under alternative or varying control methods, and can include similar or dissimilar materials and/or solid state devices. Additionally, the design and placement of the various components can be rearranged such that a number of different in-line configurations could be realized.

The embodiments disclosed herein provide an aircraft starting and generating system having MOSFET-based bridge construction. One advantage that can be realized in at least one of the above embodiments is that the above described embodiments implement MOSFET-based controllable bridges that can perform both inverting and converting functions based on the control method and/or pattern. For example, by utilizing SVPWM for certain functions, the starter/generator can achieve synchronous gating while minimizing the losses in the MOSFET-based bridge. Furthermore, when conducting current across the MOSFET devices in the reverse direction of the reverse conduction based inactive rectification, the power losses across the MOSFET can be lower than the power losses caused by the forward voltage drop in a diode, thus further minimizing power losses.

Additionally, with the rise of electronic flight control actuation, the demand on electrical power systems for aircrafts has increased, compared to conventional flight control actuation. Moreover, when the increased demand on the electrical power systems due to electronic flight control actuation has ceased, the increase in available power of the power systems can threaten other sensitive electronics that can be damaged by power surges. The LLU, incorporating the MOSFET-based gate control methods described herein provide both supplemental electrical power when the electrical demand is high, and absorb excess electrical power when the electrical demand is low.

Yet another advantage that can be realized in at least one of the above embodiments is that the wide-band game MOSFET devices have advantages of lower losses, higher switching frequency, and higher operating temperature compared to the conventional semiconductor devices. Furthermore, while body diodes are utilized during the control methods and tend to have higher power losses than MOSFET operation alone, the use of such diodes are minimized, which in turn provides lower power losses for the electrical system.

Yet another advantage that can be realized in at least one of the above embodiments is that the embodiments have superior weight and size advantages over the starter/generator, exciter, LLU, and four leg inverter/converter systems. Moreover solid state devices such as the MOSFET-based bridges have lower failure rates, and increased reliability. When designing aircraft components, important factors to address are size, weight, and reliability. The resulting embodiments of the invention have a lower weight, smaller sized, increased performance, and increased reliability system. Reduced weight and size correlate to competitive advantages during flight.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

This written description uses examples to disclose the embodiment of the invention, including the best mode, and also to enable any person skilled in the art to practice the invention, including making and using any devices or systems and performing any incorporated methods. The patentable scope of the embodiment is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aircraft starting and generating system, comprising:
   a starter/generator that includes a main machine, an exciter, and a permanent magnet generator;
   a direct current power output from the starter/generator;
   a load-leveling unit selectively coupled with the direct current power output and having an inverter/converter/controller having a load-leveling unit metal oxide semiconductor field effect transistor-based bridge configuration and that supplies direct current power to the direct current power output in a supply mode, and that receives direct current power from the direct current power output, in a receive mode; and
   a load-leveling unit bridge gate driver configured to drive the load-leveling unit metal oxide semiconductor field effect transistor-based bridge;
   wherein the load-leveling unit bridge gate driver operates to drive the load-leveling unit metal oxide semiconductor field effect transistor-based bridge during the supply mode and the receive mode using bi-polar pulse width modulation.

2. The aircraft starting and generating system of claim 1 wherein the load-leveling unit further comprises a power storage device.

3. The aircraft starting and generating system of claim 2 wherein the power storage device comprises at least one of a battery, a fuel cell, or an ultracapacitor.

4. The aircraft starting and generating system of claim 2 wherein the power storage device is configured to discharge power to the inverter/converter/controller during the supply mode and absorb power from the inverter/converter/controller during the receive mode.

5. The aircraft starting and generating system of claim 3 wherein the power storage device is configured to discharge power simultaneously and in parallel with the starter/generator during periods of peak power requirements.

6. The aircraft starting and generating system of claim 1 wherein the load-leveling unit metal oxide semiconductor field effect transistor-based bridge further comprises at least one of a silicon carbide-based bridge or Gallium Nitride-based bridge.

7. The aircraft starting and generating system of claim 1, further comprising a main machine metal oxide semiconductor field effect transistor-based bridge that is connected to a stator of the main machine, and a main machine bridge gate driver configured to drive the main machine metal oxide semiconductor field effect transistor-based bridge.

8. The aircraft starting and generating system of claim 7 wherein the main machine comprises a main machine metal oxide semiconductor field effect transistor-based bridge configuration that absorbs excess power of the system in a regeneration mode by storing the excess power in the kinetic energy of the prime mover of the aircraft, and wherein the main machine bridge gate driver operates to drive the main machine metal oxide semiconductor field effect transistor-based bridge during regeneration mode using Space Vector Pulse Width Modulation.

9. The aircraft starting and generating system of claim 8 wherein the main machine metal oxide semiconductor field effect transistor-based bridge further comprises at least one of a silicon carbide-based bridge or Gallium Nitride-based bridge.

10. The aircraft starting and generating system of claim 1 wherein the load-leveling unit metal oxide semiconductor field effect transistor-based bridge further comprises an array of individually-controllable metal oxide semiconductor field effect transistors.

11. The aircraft starting and generating system of claim 10 wherein the load-leveling unit bridge gate driver operates to drive each individually-controllable metal oxide semiconductor field effect transistor.

12. The aircraft starting and generating system of claim 1 wherein the load-leveling unit metal oxide semiconductor field effect transistor-based bridge further comprises individually-controllable wide bandgap device metal oxide semiconductor field effect transistors.

13. The aircraft starting and generating system of claim 12 wherein the metal oxide semiconductor field effect transistors further comprise external diodes configured across a body diode of the metal oxide semiconductor field effect transistors.

14. A method of controlling an aircraft starting and generating system having a starter/generator that includes a main machine having a direct current power output, an exciter, and a permanent magnet generator, a load leveling unit selectively coupled with the direct current power output and having an inverter/converter/controller having a metal oxide semiconductor field effect transistor-based bridge configuration, and a load-leveling unit bridge gate driver configured to drive the metal oxide semiconductor field effect transistor-based bridge, the method comprising:
if in supply mode, selectively coupling the direct current power output with the metal oxide semiconductor field effect transistor-based bridge and supplying power to the direct current power output from the metal oxide semiconductor field effect transistor-based bridge by driving the metal oxide semiconductor field effect transistor-based bridge during supply mode using bi-polar Pulse Width Modulation; and
if in receive mode, selectively coupling the direct current power output with the metal oxide semiconductor field effect transistor-based bridge and receiving power from the direct current power output to the metal oxide semiconductor field effect transistor-based bridge by driving the metal oxide semiconductor field effect transistor-based bridge using bi-polar pulse width modulation.

15. The method of claim 14 wherein, if in the supply mode, the supplying power from the metal oxide semiconductor field effect transistor-based bridge further comprises supplying power from a power storage device to the metal oxide semiconductor field effect transistor-based bridge.

16. The method of claim 15 wherein supplying power from a power storage device further comprises discharging at least a portion of at least one of a battery, a fuel cell, or an ultracapacitor.

17. The method of claim 14, further comprising, if in start mode, selectively coupling the direct current power output with the metal oxide semiconductor field effect transistor-based bridge and supplying power from the metal oxide semiconductor field effect transistor-based bridge and driving the metal oxide semiconductor field effect transistor-based bridge during start mode using bi-polar pulse width modulation, and wherein the driving the main metal oxide semiconductor field effect transistor-based bridge during start mode starts a prime mover of the aircraft.

18. The method of claim 17 wherein the supplying power from the metal oxide semiconductor field effect transistor-based bridge further comprises supplying power from a power storage device to the metal oxide semiconductor field effect transistor-based bridge.

19. The method of claim 14, further comprising selectively switching between the supply mode and the receive mode.

20. An aircraft comprising:
an engine;
a starter/generator connected to the engine, and having a main machine, an exciter, and a permanent magnet generator;
a direct current power output from the starter/generator;
a load-leveling unit selectively coupled with the direct current power output and having an inverter/converter/controller with a load-leveling unit metal oxide semiconductor field effect transistor-based bridge configuration and that supplies direct current power to the direct current power output in a supply mode, and that receives direct current power from the direct current power output, in a receive mode; and
a load-leveling unit bridge gate driver configured to drive the load-leveling unit metal oxide semiconductor field effect transistor-based bridge;
wherein the load-leveling unit bridge gate driver operates to drive the load-leveling unit metal oxide semiconductor field effect transistor-based bridge during the supply mode and the receive mode using bi-polar pulse width modulation.

* * * * *